(12) United States Patent
Gaither et al.

(10) Patent No.: US 6,360,301 B1
(45) Date of Patent: Mar. 19, 2002

(54) COHERENCY PROTOCOL FOR COMPUTER CACHE

(75) Inventors: Blaine D Gaither; Eric M Rentschler, both of Ft Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/290,430

(22) Filed: Apr. 13, 1999

(51) Int. Cl.[7] ............................................. G06F 12/12
(52) U.S. Cl. ..................... 711/143; 711/141; 711/142; 711/144; 711/145; 711/146
(58) Field of Search ............................. 711/3, 118–126, 711/133–136, 141–147

(56) References Cited

U.S. PATENT DOCUMENTS

| | | | |
|---|---|---|---|
| 4,928,239 A | * 5/1990 | Baum et al. | |
| 5,671,391 A |   9/1997 | Knotts | 711/143 |
| 5,732,244 A | * 3/1998 | Gujral | 711/141 |
| 5,996,048 A | * 11/1999 | Cherabuddi et al. | 711/122 |

OTHER PUBLICATIONS

"Shared Memory Systems On The Futurebus" by P. Sweazey. Digest of Papers: COMPCON Spring 88. Thirty–Third IEEE Computer Society International Conference. p. 505–11.

"Multiprocessor Cache Coherency: MOESI Model Describes Snooping Protocols" by M. Thorson. Microprocessor Report, v4, n11, p12. Jun. 20, 1990.

* cited by examiner

Primary Examiner—Than Nguyen
(74) Attorney, Agent, or Firm—Augustus W. Winfield

(57) ABSTRACT

A lower level cache detects when a line of memory has been evicted from a higher level cache. The cache coherency protocol for the lower level cache places the line into a special state. If a line in the special state is evicted from the lower level cache, the lower level cache knows that the line is not cached at a higher level, and therefore a back-invalidate transaction is not needed. Reducing the number of back-invalidate transactions improves the performance of the system.

5 Claims, 6 Drawing Sheets

COHERENCY PROTOCOL FOR COMPUTER CACHE

FIELD OF INVENTION

This invention relates generally to computer systems and more specifically to coherency protocols and inclusion in cache memory systems.

BACKGROUND OF THE INVENTION

Most computer systems employ a multilevel hierarchy of memory systems, with relatively fast, expensive, limited-capacity memory at the highest level of the hierarchy and proceeding to relatively slower, lower cost, higher-capacity memory at the lowest level of the hierarchy. Typically, the hierarchy includes a small fast memory called a cache, either physically integrated within a processor integrated circuit or mounted physically close to the processor for speed. There may be separate instruction caches and data caches. There may be multiple levels of caches.

The minimum amount of memory that can be transferred between a cache and a next lower level of the memory hierarchy is called a line, or block, or page. The present patent document uses the term "line," but the invention is equally applicable to systems employing blocks or pages.

In most multilevel caches, each cache level has a copy of every line of memory residing in every cache level higher in the hierarchy, a property called inclusion. For example, in an inclusive two-level cache system, every entry in the primary cache is also in the secondary cache. Typically, when a line is evicted from an upper level cache, the line is permitted to remain in lower level caches. Conversely, in order to maintain coherency, if a line is evicted from a lower level cache, the lower level cache must issue a bus transaction, called a back-invalidate transaction, to flush any copies of the evicted line out of upper levels of the cache hierarchy. Back-invalidate transactions occur frequently and have a significant impact on overall performance, because of increased bus utilization between the caches and increased bus monitoring (snoop) traffic. There is a need for reducing the number of back-invalidate transactions in order to improve performance.

Many computer systems employ multiple processors, each of which may have multiple levels of caches. All processors and caches may share a common main memory. A particular line may simultaneously exist in shared memory and in the cache hierarchies for multiple processors. All copies of a line in the caches must be identical, a property called coherency. The copy of a line in shared memory may be "stale" (not updated). If any processor changes the contents of a line, only the one changed copy is then valid, and all other copies must be then be updated or invalidated. The protocols for maintaining coherence for multiple processors are called cache-coherence protocols. In some protocols, the status of a line of physical memory is kept in one location, called the directory. In other protocols, every cache that has a copy of a line of physical memory also has a copy of the sharing status of the line. When no centralized state is kept, all cache monitors monitor or "snoop" a shared bus to determine whether or not they have a copy of a line that is requested on the bus. The present patent document is relevant to any multi-level cache system, but is particularly relevant to multi-processor systems, with each processor having a hierarchy of caches, all sharing a main memory, in a snooping based system.

FIG. 1 illustrates a state diagram for an example prior-art multi-processor cache-coherency protocol in a snooping based system. FIG. 1 illustrates four possible states for each line in a cache. Before any lines are placed into the cache, all entries are at a default state called "invalid" (100). When an uncached physical line is placed into the cache, the state of the entry in the cache is changed from invalid to "exclusive" (102). The word "exclusive" means that exactly one cache hierarchy has a copy of the line. If a line is in an exclusive state in a cache hierarchy for a first processor, and if a second processor requests the same line, the line will then be copied into two cache hierarchies, and the state of the entry in each cache is set to "shared" (104). If a line is modified in a cache, it may also be immediately modified in shared memory (called write through). Alternatively, a cache may write a modified line to shared memory only when the modified line in the cache is invalidated or replaced (called write back). FIG. 1 assumes that the cache is a write-back cache, and accordingly when a line in the cache is modified, the state of the entry in the cache is changed to "modified" (106). The protocol of FIG. 1 is sometimes called a MESI protocol, referring to the first letter of each of the four states.

In the protocol of FIG. 1, the modified state (106) is effectively an exclusive modified state, meaning that only one cache hierarchy in the system has a copy of the modified line. Some systems add an additional modified state to enable multiple caches to hold a copy of modified data. FIG. 2 illustrates a prior art protocol in which an additional state has been added, called "owned" (208). States 200, 202, and 206 in FIG. 2 have the same function as the identically named states for FIG. 1. In contrast, in the protocol of FIG. 2, other cache hierarchies may be holding copies of a modified line in the shared state (204), but only one cache hierarchy can hold a modified line in an owned state (208). Only the one cache holding a modified line in the owned state can write the modified line back to shared memory.

SUMMARY OF THE INVENTION

New additional cache coherency states are provided that indicate that a line is not cached in higher levels of the cache hierarchy, and therefore no back-invalidate transaction is required when the line is evicted. One new state is called Mu, for modified and uncached, meaning that the modified line is uncached in a higher level of the cache hierarchy. Similarly, Su (shared and uncached) and Eu (exclusive and uncached) states may be provided.

For the Mu state, the system snoops evictions from upper levels of the cache hierarchy. More specifically, any write-back from an upper level cache is written through the lower level cache. On receiving a write-back from an upper level, the lower level cache changes the state of the relevant entry to Mu. If a line having a state of Mu is evicted, no back-invalidate transaction is generated. If a line in the Mu state is subsequently read, the state is switched to M (modified).

Su and Eu states may be provided whenever the system provides a hint that a line is not cached in higher levels of the cache hierarchy. For example, if a system provides a transaction to inform a lower level cache or directory when a clean line is displaced from an upper level cache, then the Su and Eu states may be provided.

DETAILED DESCRIPTION OF THE PREFERRED EMBODIMENT OF THE INVENTION

Figure 3:
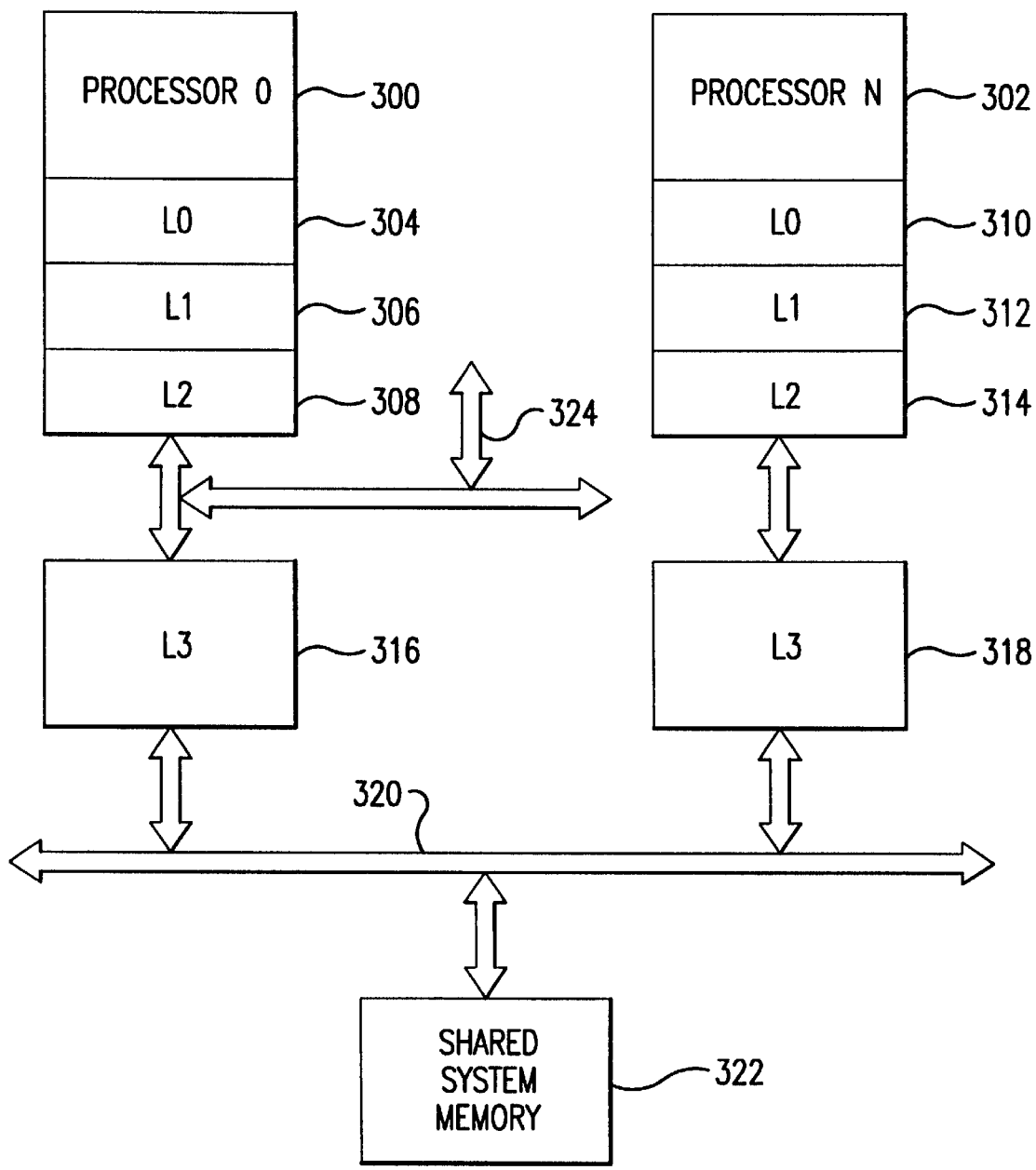
FIG. 3 is a block diagram of an example computer system suitable for use with the invention.

The invention is applicable to any multi-level cache system, but is particularly advantageous in large multiprocessor systems. FIG. 3 illustrates an example of a computer system in which the present invention is particularly applicable. In FIG. 3, a computer system has N processors, two of which are illustrated (300, 302). Each processor has three levels of internal caches (304, 306, 308 and 310, 312, 314) and a fourth external cache (316, 318). All processors and their associated cache hierarchies share a system bus 320 and a system memory 322. Bus 324 illustrates that multiple processors may share an external cache, such as cache 316. The invention deals with a cache coherency protocol that might be used for any lower level cache, for example, the two L3 caches (316 and 318) in FIG. 3. In a system in accordance with the invention, a lower level cache, for example cache 316, detects when a line is evicted from a higher level cache. If a line has been evicted from a higher level cache, then there is no need for a back-invalidate transaction when the line is evicted from the lower level cache. Accordingly, the lower level cache coherency protocol includes an additional state that indicates that a line is not cached at higher levels, and therefore does not require a back-invalidate transaction when evicted. Reduction of back-invalidate transactions improves performance.

Some computer systems may use a directory instead of a lower level cache. A directory is a set of tags for all of the shared system memory. The tags include state bits to indicate states such as Modified, Exclusive, Shared, and Invalid. The tags can also indicate which caches have copies of a line. For purposes of the invention, a directory is a cache (which happens to be very large) and the invention is equally applicable to states within a directory.

Figure 1:
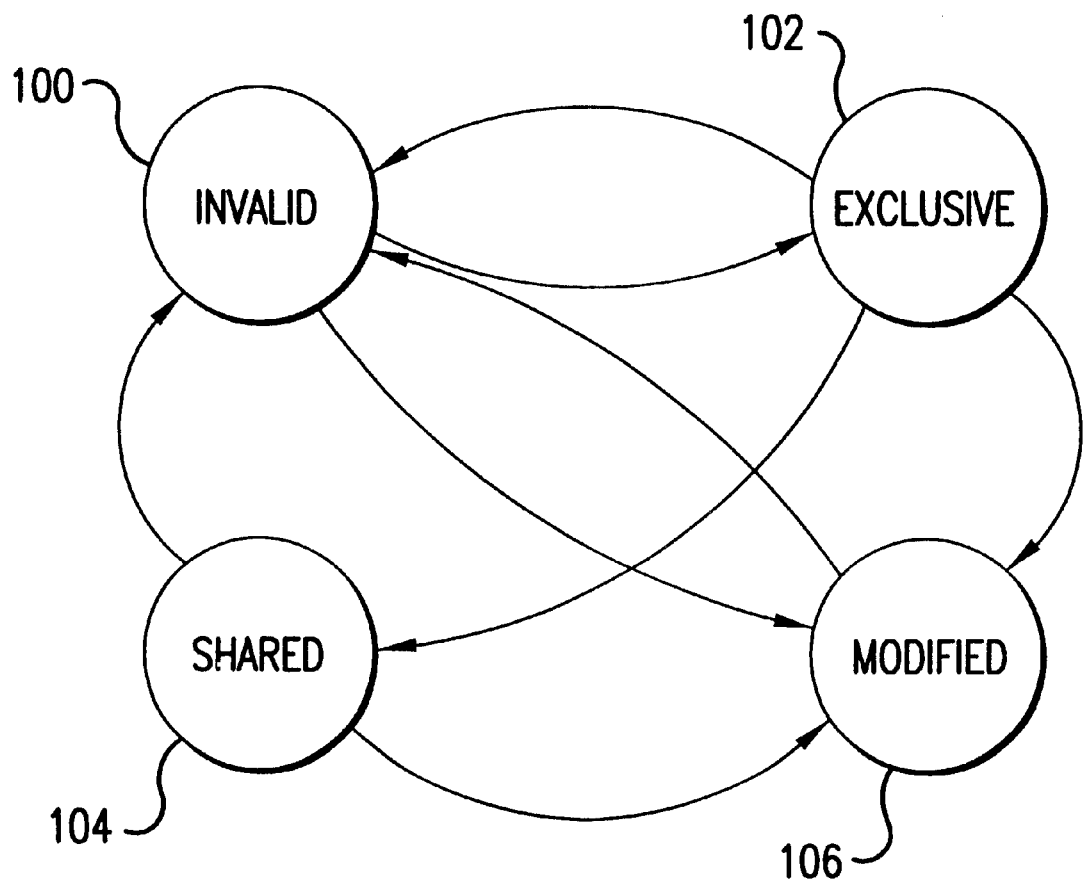
FIG. 1 is a state diagram of a prior art cache coherency protocol.
Figure 2:
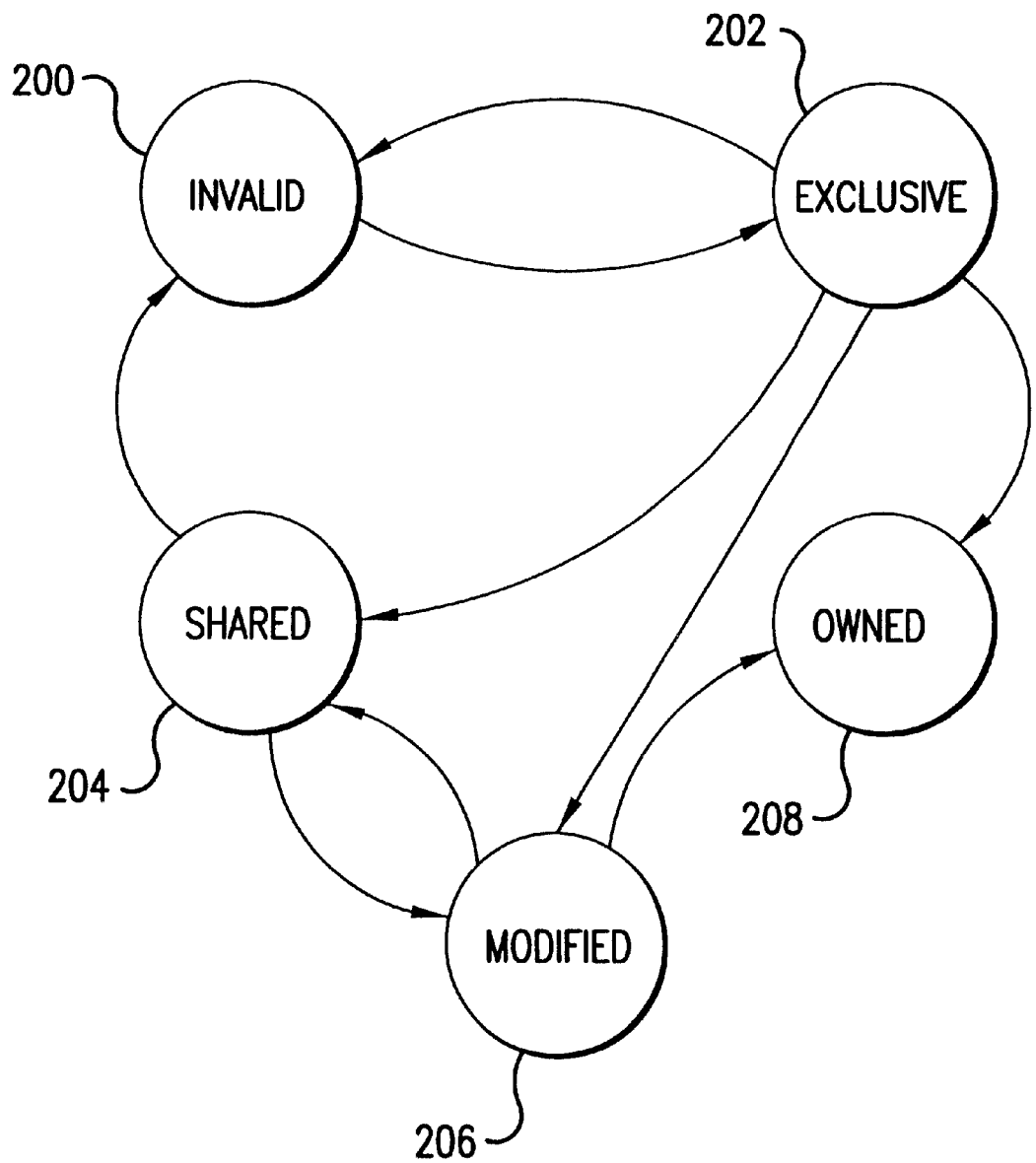
FIG. 2 is a state diagram of a prior art variation of the protocol of FIG. 1.
Figure 4:
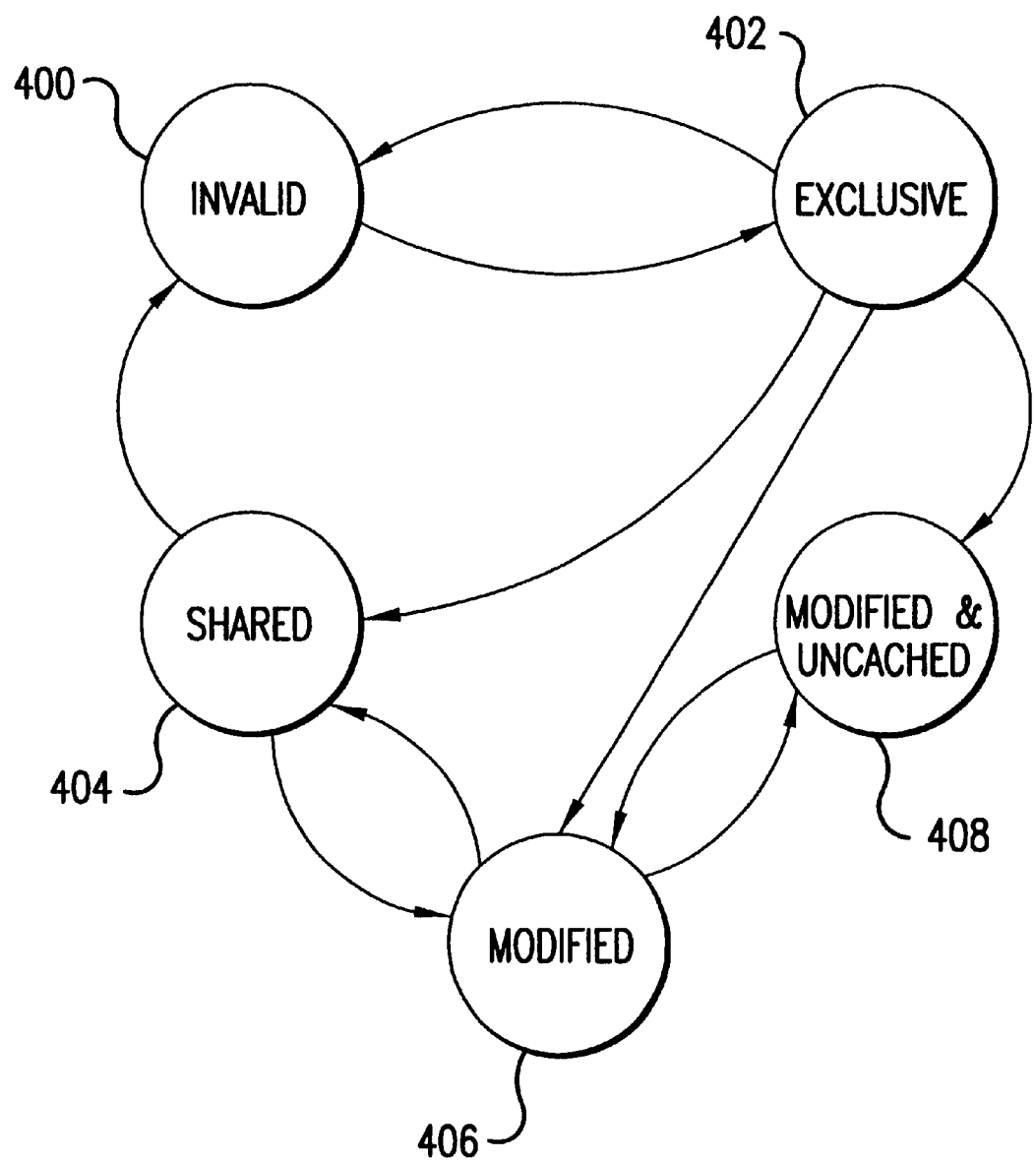
FIG. 4 is a state diagram of a cache coherency protocol in accordance with an example embodiment of the invention.

FIG. 4 illustrates an example embodiment of a cache coherence protocol in accordance with the invention. FIG. 4 illustrates an additional state (Modified uncached), Mu (408), being added to the prior art protocol of FIG. 1. The additional state could also be added to the prior art protocol of FIG. 2, or in general, any protocol having an M (modified) state. If a line is at state Mu, and the line is evicted, no back-invalidate transaction is generated. For example, in the system in FIG. 3, if a line in cache 316 is at state Mu, and the line is evicted from cache 316, cache 316 does not need to issue a transaction to evict the line from caches 304, 306, or 308.

In the protocol illustrated in FIG. 4, if a lower level cache detects a write-back transaction from a higher level cache in the same hierarchy, the state of the line that has been evicted from the higher level cache is changed in the lower level cache from M (406) to Mu (408). For example, in FIG. 3, assume that for processor 0 (300), cache L2 (308) evicts a line. L2 then writes-back to a lower level cache (L3) or shared memory (322). Cache L3 (316) detects the write-back transaction, and the corresponding tag or address, and the state of the corresponding entry in L3 (316) is switched to Mu (FIG. 4, 408). If a line having a state of Mu is read, the state is switched to M (406). For example, in FIG. 3, if a line in cache 316 is at state Mu, and the line is then read by processor 0 (300), the state of the line in cache 316 is switched to M (406).

Figure 5:
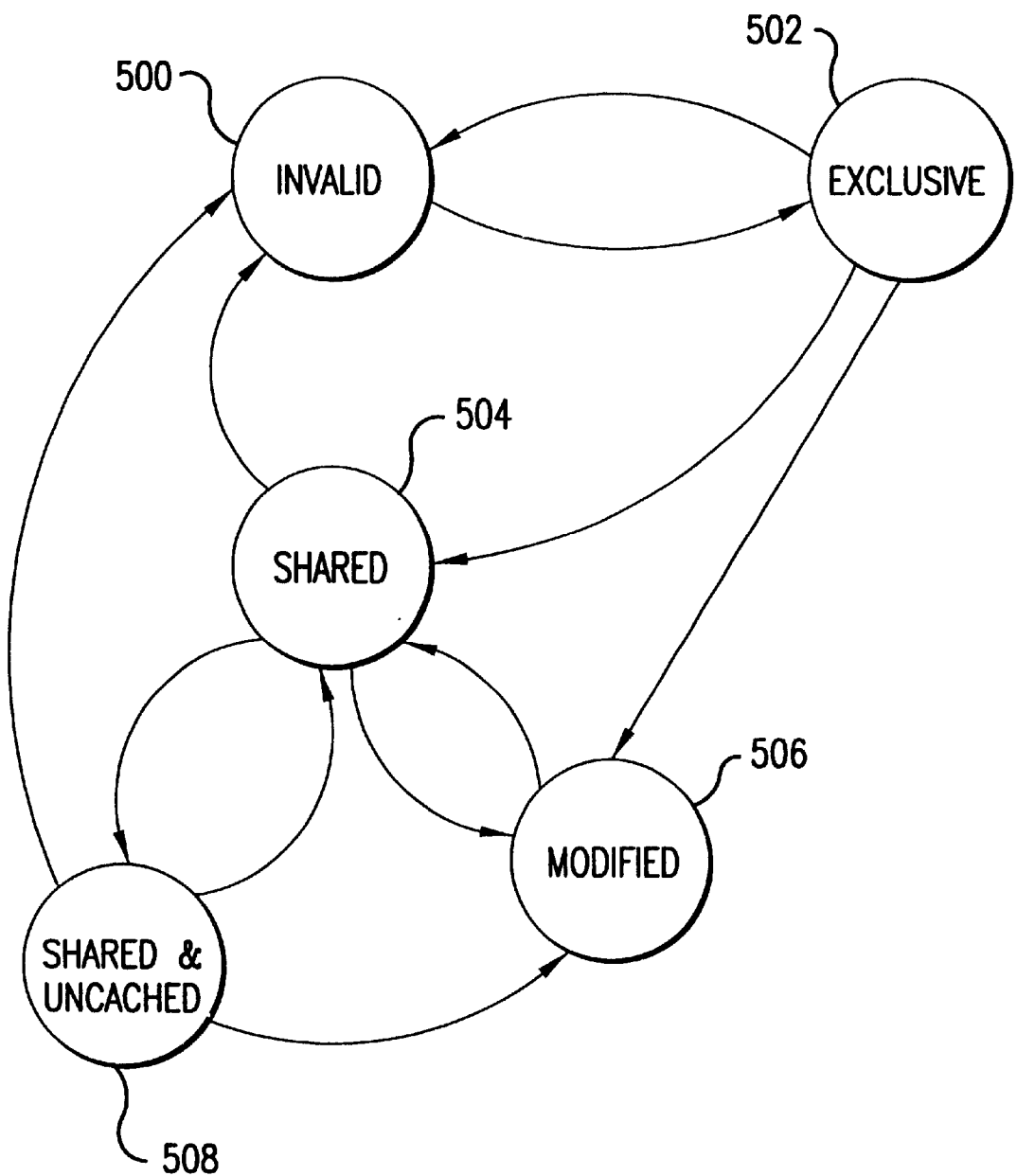
FIG. 5 is a state diagram of a cache coherency protocol in accordance with an alternative embodiment of the invention.
Figure 6:
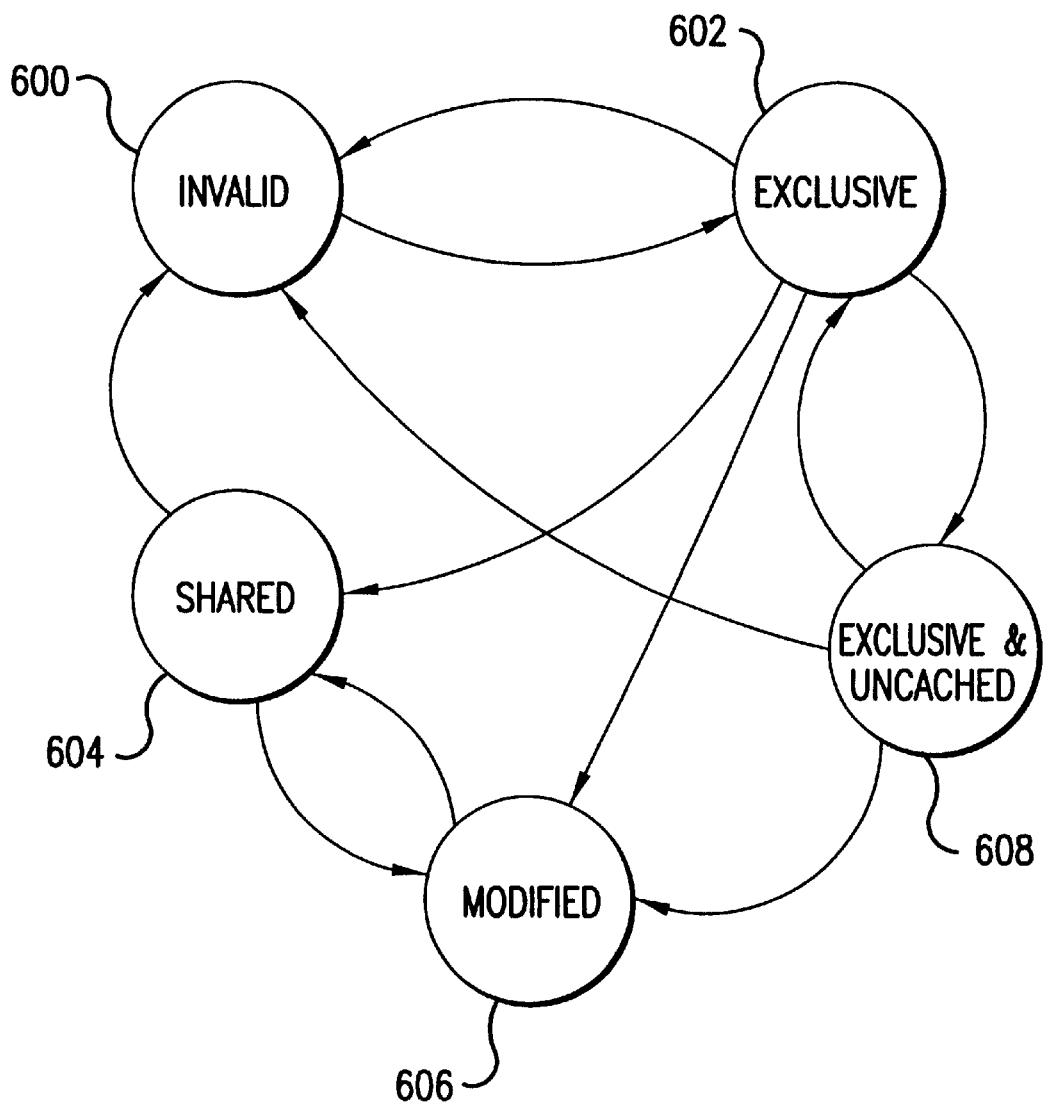
FIG. 6 is a state diagram of a cache coherency protocol in accordance with an alternative embodiment of the invention.

In the system of FIG. 4, a write-back transaction is used by the lower level cache to learn when a modified line is evicted from a higher level cache. If the system provides a transaction or other hint to indicate that a clean line has been evicted from a higher level cache, for example, an explicit write-back/update transaction, then additional states can be added for shared and uncached, and exclusive and uncached. FIG. 5 illustrates an additional state (Shared uncached) state, Su (508), being added to the prior art protocol of FIG. 1. FIG. 6 illustrates an additional state (Exclusive uncached), Eu (608), being added to the prior art protocol of FIG. 1. For FIGS. 5 and 6, detection of a specific transaction or hint indicating eviction of a clean line causes a transition from the shared state 504 to the Su state 508, or transition from the exclusive state 602 to the Eu state 608.

If a line is in the Su (FIG. 5, 508) or Eu (FIG. 6, 608) states in cache 316 (FIG. 3), a subsequent read of the line by processor 300 will cause the line to transition to Shared or Exclusive (respectively). If a line is in the Su or Eu states in cache 316, a write to the line by processor 300 will cause the line to transition to the Modified (406, 606) state in cache 316. If a line is in the Su or Eu states in cache 316, and processor 302 issues a read for the line, the read is broadcast on bus 320. The snoop operation performed by cache 316 will cause the line to transition to Shared (504, 604). There is no need for an invalidate transaction to be sent to caches 304, 306 and 308. If a line is in the Su or Eu states in cache 316, and an invalidate for the line, or a write to the line, is snooped on bus 320, the line will transition to the Invalid state (500, 600) in cache 316, and there is no need for an invalidate transaction to be sent to caches 304, 306 and 308.

The additional Mu, Su and Eu states, shown in FIGS. 4, 5 and 6 respectively, are not mutually exclusive. Any combination of the additional states may be implemented within one system as appropriate.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain. the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for maintaining coherence for a data storage system, the method comprising the following steps:

detecting, by a first cache, that an entry has been evicted by a higher level cache;

switching, by the first cache, a first state of the entry in the first cache, to a second state from which the entry can be evicted from the first cache without having to be invalidated in the higher level cache, the second state being in addition to an Exclusive state.

2. The method of claim 1 where the first cache is a directory.

3. The method of claim 1, the step of detecting further comprising:

detecting that a higher level cache has executed a write-back transaction.

4. A computer system comprising:

a cache hierarchy having a coherency protocol in which a particular coherency state of an item in a cache at one level in the hierarchy indicates that the item has been evicted from a cache at a higher level in the hierarchy, wherein the particular coherency state is in addition to an Exclusive state.

5. A method for maintaining coherence for a data storage system, the method comprising the following steps:

detecting, by a first cache, that an entry, which has not been modified, has been evicted by a higher level cache;

switching, by the first cache, a first state of the entry in the first cache, to a second state from which the entry can be evicted from the first cache without having to be invalidated in the higher level cache.

* * * * *